Figure 1:
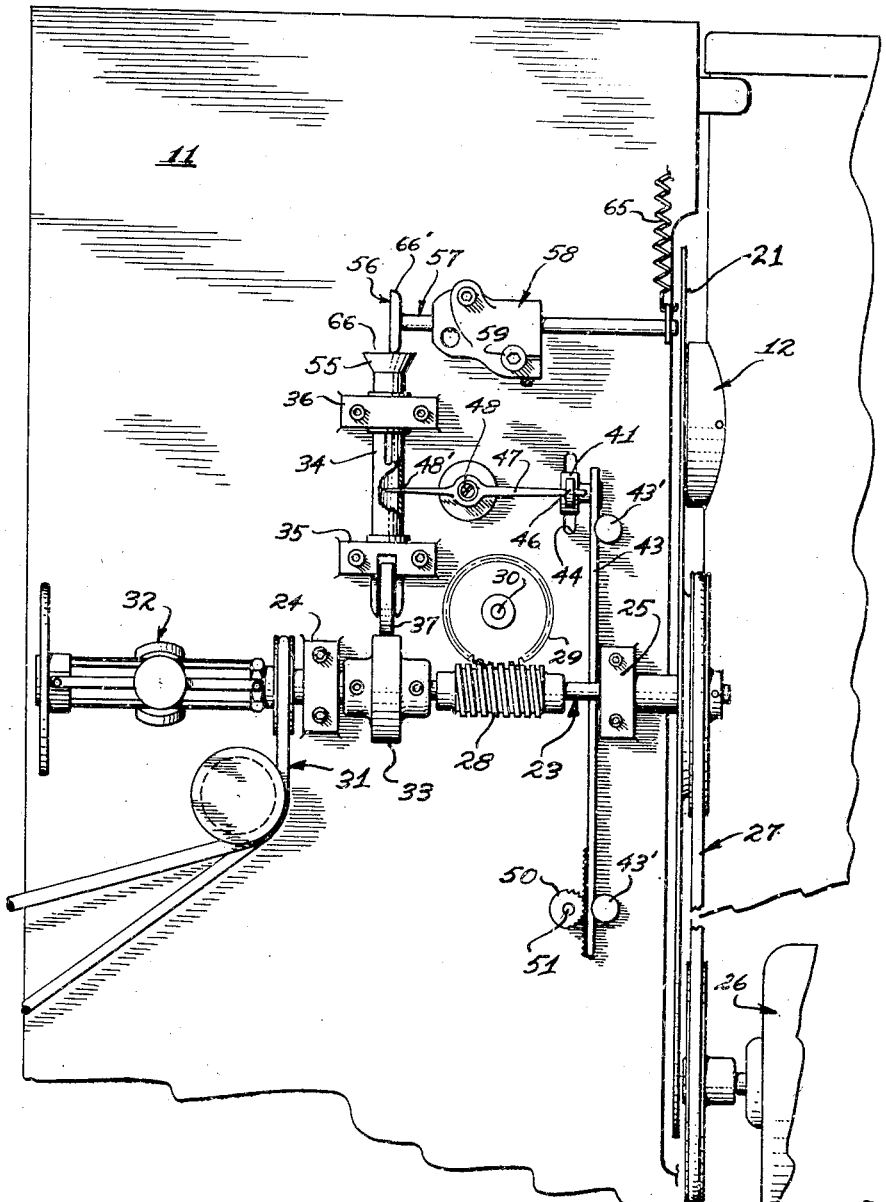

Nov. 8, 1949　　　　　　　　J. R. HEARST　　　　　　　　2,487,335
　　　　　　　　　MOTION-PICTURE PROJECTOR OF THE
Filed June 28, 1946　　　CONTINUOUSLY MOVING FILM TYPE　　　3 Sheets-Sheet 1

Inventor
JOHN R. HEARST
By Ross J. Garofalo
Attorney

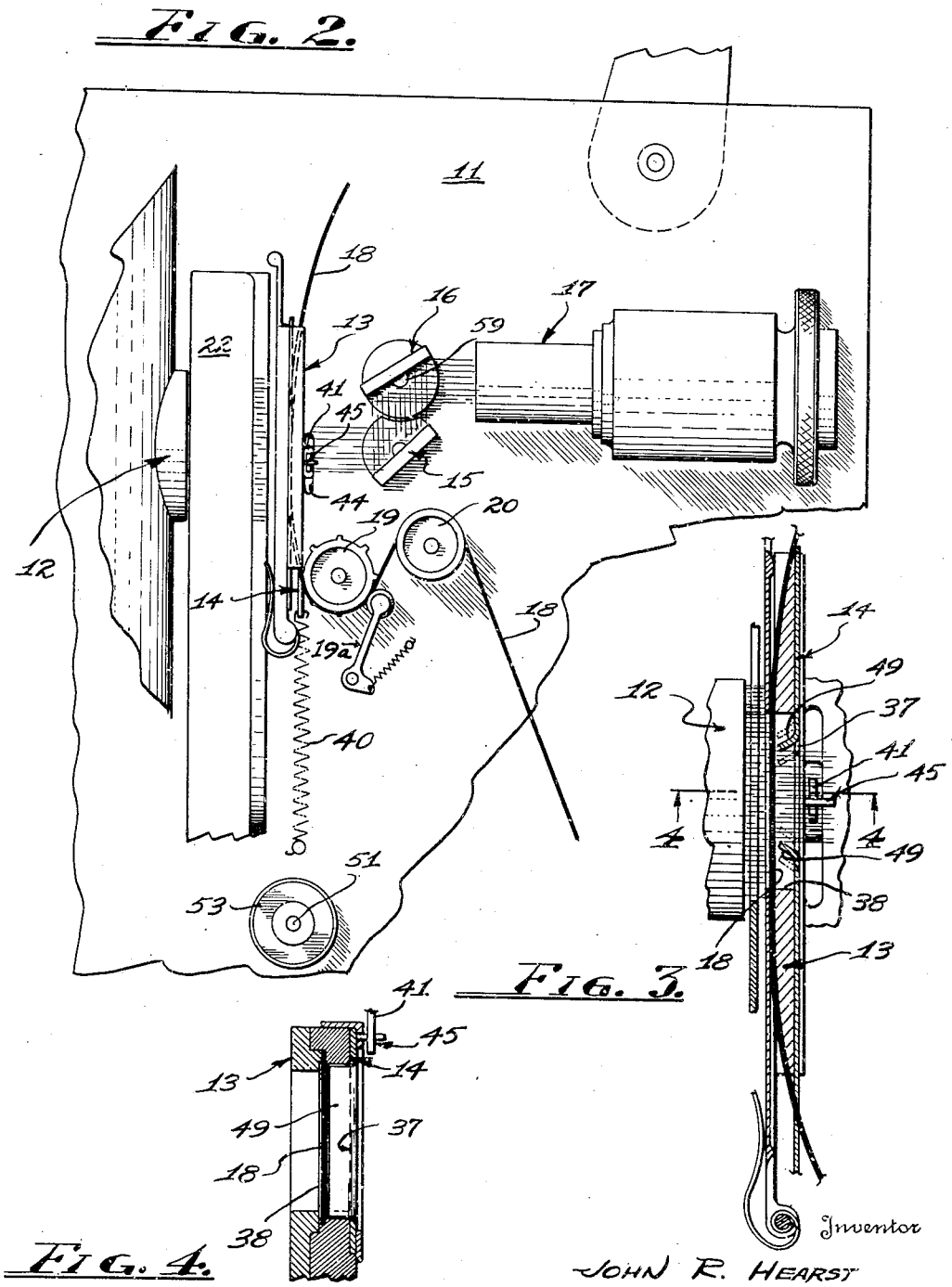

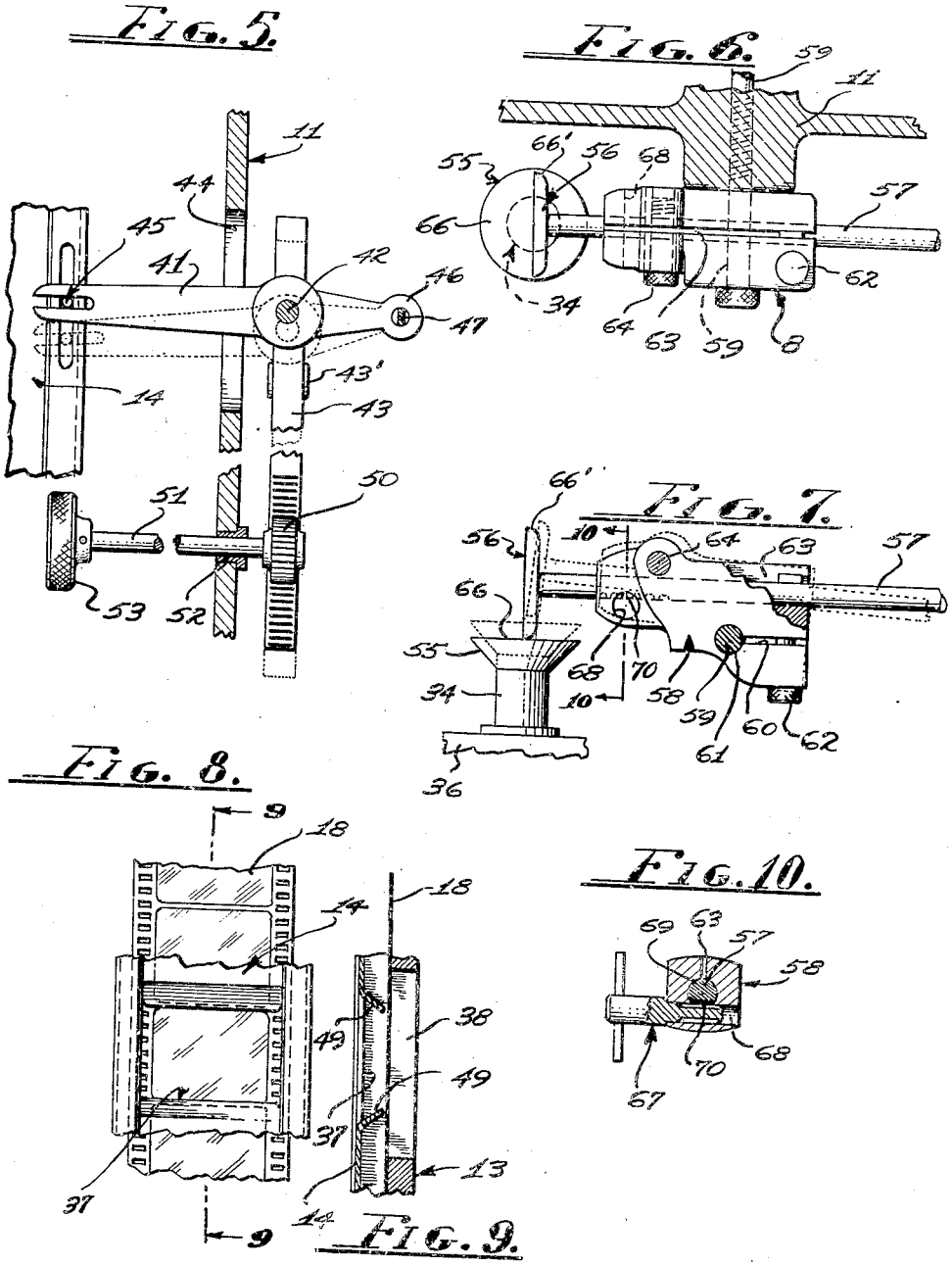

Patented Nov. 8, 1949

2,487,335

UNITED STATES PATENT OFFICE 2,487,335

MOTION-PICTURE PROJECTOR OF THE CONTINUOUSLY MOVING FILM TYPE

John R. Hearst, Rosemead, Calif., assignor of forty-five one-hundredths to Charles E. Crosby and one-tenth to Ross J. Garofalo Application June 28, 1946, Serial No. 680,195

11 Claims. (Cl. 88—16.8)

The present invention relates to improvement in motion picture projectors of the type in which the film is moved past the film gate aperture in a continuous stream. The invention relates particularly to improvements in continuous feed projectors involving the use of an oscillating reflecting flat or mirror in the optical system of the machine operating in timed relation to the framing of film pictures in the film gate aperture as well as to the operation of the usual shutter which controls the transmission of light to the screen.

One of the objects of my invention is to provide in a projector of the continuous feed type, a new control element which may be aptly called a shuttle which is reciprocated by the same means which oscillates the mirror in synchronism therewith and constructed and arranged to correctly frame each film picture across the transverse lines between frames with the said lines bisected by margins of the shuttle and shielded at the proper time in consideration of the oscillatory movement of the mirror.

Another object of my invention is the provision in a projector of the character described of a simple means for making corrective adjustments of the shuttle in order to properly frame the film while the projector is in operation.

Yet another object is the provision of a means for changing the angle of reflection and stroke range of the oscillatory mirror to correct the inaccuracy or error in the mirror movement occasioned by the transposition to the mirror of the reciprocatory movement of an operating member or tappet therefor.

A further object is the provision of a projector of extended practical value due to the simplicity of the construction and arrangement and reliability of performance of the parts and elements thereof and the fact that the majority of the functional parts can be produced by punch press operations in the form of stampings.

Another object is to provide a projector which is constructed and arranged to be operated without the failures and objections which have heretofore attended the operation of continuous feed projectors.

With the foregoing objects in view, together with such other objects, features and advantages as may subsequently appear, the invention resides in the parts and in the combination, construction and arrangement of parts hereinafter described and claimed, and illustrated by way of example in the accompanying drawing, in which—

Fig. 1 is a fragmentary side elevational view of the chassis plate of my improved projector looking toward the side thereof supporting the operating or power transmission means, Fig. 2 is a fragmentary side elevational view of the other side of the chassis plate on which the optical elements are supported, Fig. 3 is an enlarged fragmentary vertical sectional view of the film gate unit, showing how my improved reciprocatory shuttle unit is embodied in said gate unit, Fig. 4 is a fragmentary cross sectional view taken on the line 4—4 of Fig. 3, Fig. 5 is an enlarged fragmentary view partly in side elevation and partly in section of the shuttle reciprocating means and the means for framing or adjusting the shuttle, Fig. 6 is a fragmentary top plan view of the mirror oscillating means and tappet therefor, with the adjusting key removed, Fig. 7 is a fragmentary side elevational view partly in section of the means shown in Fig. 6, Fig. 8 is a fragmentary front elevational view of the film gate and shuttle unit, Fig. 9 is a sectional view taken on the line 9—9 of Fig. 8, and Fig. 10 is a vertical sectional view taken on the line 10—10 of Fig. 7 showing how the adjusting key for the mirror oscillating means is applied.

Referring to the drawings more specifically, it will be seen that one embodiment of my improved projector includes an upright chassis plate 11 adapted to be mounted within the housing structure, not shown, of the projector so as to support on one side as shown in Fig. 1 the power transmission elements of the projector while on the other side as shown in Fig. 2 are supported the optical elements of the machine.

As shown in Fig. 2, the optical elements and associated parts include a source of light 12, a film gate unit 13, the novel reciprocatory shuttle 14 of this invention arranged in the film gate, a stationary reflecting flat or mirror 15 mounted in optical alignment with the film gate and shuttle assembly, and an oscillatory mirror 16 mounted above and in optical registry with the mirror 15 and a lens unit 17 which latter with the mirrors complete the optical train for projecting images on the usual screen.

The film designated 18 is unreeled from a conventional type feed reel, not shown, in a continuous stream through the gate 13 by means of a power driven sprocket 19, held thereon by spring tensioned pad-roller 19a and is passed over an idler pulley 20, then led to a conventional type take-up reel not shown. A suitable conventional black-out shutter 21 as best shown in Fig. 1 is rotatably supported between the light source and film gate. Fig. 2 shows a housing 22 in which the shutter 21 is mounted.

Referring now to Fig. 1, it will be apparent that the shuttle 14, oscillatory mirror 16 and rotary shutter 21 referred to above are driven from a main tansmission shaft 23 mounted horizontally in bearings 24 and 25 on the side of the plate 11 opposite that on which the optical train is supported. This shaft is driven from an electric motor 26 through a belt and pulley drive means 27. The shutter 21 is mounted directly on the main shaft for rotation therewith.

A worm 28 on the shaft 23 drives a worm gear 29 fixed to a shaft 30 supported in the plate 11 and operating sprocket 19 thereby providing for a continuous feed of film through the film gate. A belt pulley drive means 31 is taken off the shaft 23 for operating the take-up reel on which the film is wound after being continuously fed through the film gate. A suitable governor unit 32 is mounted on the shaft 23 to control the speed thereof.

The oscillatory mirror 16 and the reciprocatory framing shuttle 14 are actuated in timed relation by a common drive means which includes a cam 33 on the main shaft 23, a reciprocating tappet member 34 supported vertically on the chassis plate 11 in bearings 35 and 36 and drive connections to said mirror and shuttle which will be hereinafter described. An anti-friction roller 37 carried on the lower end of this tappet rides on the cam 33 so that said tappet will be reciprocated when the shaft 23 and cam thereon are rotated.

The reciprocating framing shuttle 14 as shown in Figs. 2, 3 and 4 is in the form of a thin plate having a framing opening 37 therein dimensioned to correspond to the height of one frame between the transverse lines separating the frames of the film. This shuttle is disposed for sliding and guided contact with portions of the film gate 13 and has the framing opening 37 registered with the film gate aperture 38 which latter has a length equal to that of two film frames. The lower end of the shuttle 14 as shown in Fig. 2 is connected to a retractible spring 40 fastened to the plate 11 and operating to take up play in the connections of the parts of the operating means for the shuttle.

A shuttle operating lever 41 shown in Figs. 1 and 5 is pivoted between its ends as at 42 on a vertically adjustably rack bar 43 in guides 43' on the plate 11. This lever extends through a slot 44 in the plate 11 and one end thereof has a pin and slot connection 45 with the shuttle as shown in Fig. 5 while the other end is provided with an eye 46 through which one end of a tappet operated lever 47 is extended so that on rocking of lever 47 the lever 41 will be correspondingly rocked and thus reciprocate the shuttle 14. The lever 47 as shown in Fig. 1 is pivoted as at 48 between its ends on the plate 11 and has its other end extended loosely through a transverse opening 48' in the tappet 34 so that on operation of the tappet by the cam 33, the lever 47 will be rocked and operate lever 41 so as to reciprocate the shuttle 14.

In order that the shuttle 14 function to frame the film in the exact manner as here prescribed, the portions of the shuttle defining the transverse margins of the framing opening 37 are bent inwardly to form flange portions 49 which converge somewhat and have their outer edges disposed in close proximity to the film and so spaced that they will cover, as best shown in Figs. 8 and 9, the transverse lines bounding each picture framed. Any other construction of the shuttle by which portions thereof cover the transverse lines of the film is deemed within the purview hereof. The sides of the film frames are framed by the film gate aperture 38 whereas the framing aperture 37 may be of greater width than the film frames since the chief function of the shuttle is to mask out the portions of contiguous frames above and below the desired frame to be projected on the screen, this being necessary in view of the fact that the aperture 38 has a height equal to that of two film frames as stated above. The desired frame on picture is thus properly framed in timed relations to the reflecting action of mirror 16.

The vertically adjustable rack bar 43 as shown in Figs. 1 and 5 is subject to adjustment through the medium of a pinion 50 meshing therewith and fixed on a shaft 51 mounted in a bearing 52 in the plate 11. A knob 53 on said shaft provides for rotation of the shaft and pinion to adjust the rack bar and shift the shuttle operating lever 41 bodily to thus adjust the shuttle. This adjusting means may be aptly termed a shuttle-framing means which is subject to ready operation in order to correct the position and stroke of the shuttle in case of misalignment thereof with the film frames due to breaking and rejoining of the film or any other lack-of-registry causes and is an important provision of this invention.

As a means for oscillating the mirror 16 in synchronism with the action of the shuttle and that of the shutter, the tappet 34 is provided with a head 55 which abuts a circular disk 56 on a lever 57 axially adjustably supported in a bracket 58. This bracket is fixed to one end of a rock shaft 59 which is supported by and extends through the plate 11. The mirror 16 is mounted on the shaft 59 so as to be oscillated on the rocking of said shaft. The portion of the bracket 58 to which the shaft 59 is fixed is split as at 60 as shown in Fig. 7 and provided with an opening 61 to receive the shaft. A screw 62 is employed to clamp this split portion around the shaft thus fixing the bracket to the shaft. The portion of the bracket 58 through which the lever 57 extends is longitudinally split as at 63 and clamped around the lever 57 by means of the screw 64 thereby releasably securing the lever against axial adjustment in the bracket. A spring 65 as shown in Fig. 1 is fastened at its ends to the lever 57 and plate 11 and holds the disk 56 on the lever 57 against the head 55 of the tappet 34 so that the lever 57 will rock incident to reciprocation of the tappet thereby rocking the shaft 59 and oscillating the mirror 16.

As a means for correcting the inaccuracy or error in the movement of the mirror 16 as occasioned by the transposition to the mirror of the vertical reciprocating movement of the tappet, the head 55 of the tappet is formed with a flat bearing surface 66 for a particular cam or curved contact surface 66' provided on the periphery of the disk 56. This cam surface is of such formation that as the disk 56 moves up and down in an arcuate path with the rocking of the lever 57 responsive to reciprocation of the tappet, it will transverse said bearing surface with a cam action that regulates the effective stroke of the lever 57 and assures that the mirror will be oscillated in a predetermined path with uniform strokes.

By axially adjusting the lever 57 the cam surface 66' may be brought to different positions on said bearing surface 66 to change the leverage of lever 57 and thus vary the range of the strokes of the mirror as required. Axial adjustment of the lever 57 may be effected by means of a toothed key 67 which as shown in Fig. 10 is inserted in a transverse bore 68 that intersects the bore 69 in which the lever 57 is mounted in the bracket 58. This key is engaged with finely spaced rack teeth 70 on the lever 57 and after loosening the screw 64, may be turned whereby the lever may be shifted laterally in order to obtain rock steady projection. Screw 64 of course, is tightened in order to hold the adjustment. Fig. 7 clearly shows how this adjustment may be effected.

It should be noted that the oscillatory strokes of the mirror and the reciprocable strokes of the shuttle are comparatively small, yet by reason of operating the mirror and shuttle from a common cam-operated tappet with the particular means hereof, the mirror and shuttle are definitely moved in a positive and unvarying timed relation which is a feature contributing to the successful production of clear screen pictures with my improved projector.

The following description of the operation of the projector will be made with special reference to one complete cycle, this constituting a 360 degree rotation of the shaft 23.

After the film is threaded on the projector in the usual manner, that is, by taking the film from the feed reel and passing it through the film gate unit 13, to and partly around sprocket 19, over idler roller 20 onto the take-up reel, the motor 26 is started and the light from the light source 12 is turned on. Starting of the motor will rotate the shaft 23 which in turn actuates the driving mechanisms for sliding the film through the film gate, for reciprocating the shuttle 14, for rotating the shutter 21 and for oscillating the oscillatory mirror 16. Thus rotation of the shaft 23 rotates the worm 28 and worm gear 29 which in turn rotates the film sprocket 19 which pulls the film through the film gate 13 and permits the film to be rewound on the take-up reel.

As the film slides through the gate 13, it passes the aperture 38 of the gate 13 where the film is exposed to the light from the light source. The aperture being twice the height of any film frame will thus expose the film frame to the light for the time necessary to complete one projection cycle. However, as the desired film frame is preceded and followed by contiguous film frames, there will be projected on the screen three images, one above the other. The center image is the desired image to be projected while the upper image fades out towards the top and the lower image fades out towards the bottom. Therefore, in order to mask out the upper and lower contiguous images from the desired center image, the shuttle 14 is provided with an opening having a height equal to only one film frame. As any given film frame is completely exposed in the top of the aperture 38, the shuttle 14 is positioned directly in front of said film frame and will travel down with said film frame at the same film speed, thereby masking out all extraneous images from the screen.

The movement of the shuttle 14 down with the film frame at the film speed is accomplished by the rotation of shaft 23 which in turn rotates cam 33 which cam actuates roller 37 and tappet 34, thus actuating lever 47 which in turn actuates lever 41, the latter actuating the shuttle. When the shuttle 14 is at the top of its return movement, the high part of the cam 33 will be in contact with the roller and the contact point 48' of the lever 47 will likewise be at its highest position, while the eye 46 in lever 41 will be at its lowest position while pin 45 on the shuttle 14 will be at its highest point. Thus further rotation of the shaft 23 will cause the tappet to travel downward and through the lever arrangement, the shuttle 14 will be reciprocated downward.

As the image exposed in the shuttle aperture 37 travels downwardly, it is picked up by the stationary reflecting flat 15 which is fixed at a 45 degree angle to the film at the point of projection. This stationary flat in turn reflects the image onto the oscillating mirror 16 which will be at a 45 degree angle at the center of its oscillatory movement. The oscillatory mirror 16 thus oscillates an equal amount above and below the 45 degree angle. The oscillatory mirror in turn reflects the image through the lens system 17 onto the screen.

The oscillation of the reflecting mirror 16 is accomplished by the rotation of the shaft 23 which as described above rotates cam 33, actuating tappet 34, and shaft 57, rocking shaft 59 to which the oscillatory flat 16 is attached. When the shuttle 14 is at the top of its reciprocating stroke, the oscillatory mirror 16 will be at the top of its oscillatory stroke. Further rotation of the shaft when the said flat 16 is at such position, will cause the tappet 34 to move downward and then rock the shaft 59, thus oscillating the oscillatory mirror 16 towards its lower portion of its angularity in a uniform manner.

From the foregoing, it will be seen that the rotation of the shaft 23 causes the film to be unreeled, the shuttle 14 to reciprocate and the oscillating flat 16 to oscillate, each in synchronism with each other.

To obtain the proper angularity of oscillation of the oscillatory flat 16, shaft 57 is adjustable either to increase or decrease angularity of oscillation. This can be accomplished while the machine is operating, thus providing in an accurate manner a proper adjustment to obtain rock steady projection on the screen. Locking screw 64 will hold the adjustment until such time as wear will demand a further adjustment.

As the film frame, in unison with shuttle 14 and oscillatory mirror 16 has reached the lower half of the aperture 38, the cycle of projection will have been completed and cam 33 will return the shuttle 14 and oscillatory mirror 16 to their starting positions as above described and ready for the next identical cycle.

As shuttle 14 and oscillatory mirror 16 are being returned to their starting positions, the shutter 21 will cut off the light and projection on the screen. Return of shuttle 14 and oscillatory mirror 16 is accomplished in 30 degrees of the 360 degrees revolution of the shaft 23. This permits the use of 35 degree black out sections on the shutter 21, thus providing for more light on the screen as compared with shutters on intermittent type machines where black out sections of shutters are approximately 90 degrees.

Framing is accomplished by raising or lowering the pin 42 by turning knob 53, thereby rotating pinion 50, actuating rack 43 to which pin 42 is fastened.

Of importance too is the simplicity of the power transmitting mechanism, the reduction of the number of parts therein compared to projectors as heretofore made and the fact that such mechanism includes likewise swift and readily operable mirror angle and stroke adjustments as well as the framing adjustments of the shuttle which latter is operable while the projector is in operation.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a motion picture projector having means for moving the film in a continuous stream past the film gate aperture and wherein the optical train thereof includes an oscillatory reflecting flat and the projector includes a black-out shutter movable to control the light transmission through the optical train; the improvement which consists in a shuttle mounted for reciprocatory movement in juxtaposition to said film gate aperture, the said shuttle having a framing opening therein dimensioned to encompass a complete frame of the film and having transverse margins disposed to frame out the transverse lines between the film frames and means reciprocating said shuttle in timed relation to movements of said oscillatory flat and adjusting means by which corrective adjustments of said shuttle and said reflecting flat for making proper registry thereof with said film may be made while the projector is in operation.

2. In a motion picture projector having means therein for feeding the film in a continuous stream past the film gate aperture, a source of light, an optical train including an oscillatory reflecting flat, and a shutter movable for controlling the transmission of light through said train; the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening being disposed to overlie the transverse lines between the frame picture of the film visible through said opening while the image is being reflected by said oscillatory reflecting flat through said optical train, and means for oscillating said reflecting flat and reciprocating said shuttle in timed relation to one another and said shutter to maintain the shuttle in said framed relation to pictures of the film during the oscillatory movement of said flat which causes the images to be passed through said optical train to the screen and adjusting means by which corrective adjustments of said reflecting flat may be made while the projector is in operation.

3. In a motion picture projector having means therein for feeding the film in a continuous stream past the film gate aperture, a source of light, an optical train including an oscillatory reflecting flat, and a shutter movable for controlling the transmission of light through said train; the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening being disposed to overlie the transverse lines between the frame picture of the film visible through said opening while the image is being reflected by said oscillatory reflecting flat through said optical train, and means for oscillating said reflecting flat and reciprocating said shuttle in timed relation to one another and said shutter to maintain the shuttle in said framed relation to pictures of the film during the oscillatory movement of said flat which causes the images to be passed through said optical train to the screen, the last named means including a rotary shaft, a cam thereon, a tappet member reciprocating in a straight line responsive to rotation of said cam, and drive means operated responsive to said tappet for reciprocating said shuttle and oscillating said reflecting flat.

4. In a motion picture projector having means therein for feeding the film in a continuous stream past the film gate aperture, a source of light, an optical train including an oscillatory reflecting flat, and a shutter movable for controlling the transmission of light through said train; the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening being disposed to overlie the transverse lines between the frame picture of the film visible through said opening while the image is being reflected by said oscillatory reflecting flat through said optical train, and means for oscillating said reflecting flat and reciprocating said shuttle in timed relation to one another and said shutter to maintain the shuttle in said framed relation to pictures of the film during the oscillatory movement of said flat which causes the images to be passed through said optical train to the screen, the last named means including a reciprocating tappet, a lever arranged to be rocked responsive to reciprocable movement of said tappet, means operating responsive to said lever for reciprocating said shuttle, a second lever arranged to rock responsive to said tappet and means responsive to said second lever for oscillating said reflecting flat.

5. In a motion picture projector having means therein for feeding the film in a continuous stream past the film gate aperture, a source of light, an optical train including an oscillatory reflecting flat, and a shutter movable for controlling the transmission of light through said train; the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening being disposed to overlie the transverse lines between the frame picture of the film visible through said opening while the image is being reflected by said oscillatory reflecting flat through said optical train, a reciprocable tappet member, a rotary shaft, a cam on said shaft for operating said tappet member, a drive means responsive to said tappet member for oscillating said reflecting flat, a shuttle operating lever, arranged to reciprocate said shuttle when rocked on its fulcrum, a tappet operated lever mounted to rock said shuttle operating lever responsive to reciprocation of said tappet, and an adjustable support on which said shuttle operating lever is fulcrumed selectively movable to shift said shuttle operating lever and adjust the shuttle to proper registry with the film frames while the film is being passed through said film gate.

6. In a motion picture projector having means therein for feeding the film in a continuous stream past the film gate aperture, a source of light, an optical train including an oscillatory reflecting flat, and a shutter movable for controlling the transmission of light through said train; the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening, being disposed to overlie the transverse lines between the frame picture of the film visible through said opening while the image is being reflected by said oscillatory reflecting flat through said optical train, a reciprocable tappet, a rotary shaft, a cam on said shaft for reciprocating said tappet, drive means responsive to said tappet for reciprocating said shuttle, a rock shaft on which said reflector flat is supported for oscillation, a lever-supporting member fixed to said shaft to rock therewith and a lever on said supporting member arranged to be rocked responsive to said tappet whereby said rock shaft will oscillate said reflecting flat.

7. In a motion picture projector having means therein for feeding the film in a continuous stream past the film gate aperture, a source of light, an optical train including an oscillatory reflecting flat, and a shutter movable for controlling the transmission of light through said train; the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening being disposed to overlie the transverse lines between the frame picture of the film visible through said opening while the image is being reflected by said oscillatory reflecting flat through said optical train, a reciprocable tappet, a rotary shaft, a cam on said shaft for reciprocating said tappet, drive means responsive to said tappet for reciprocating said shuttle, a rock shaft on which said reflector flat is supported for oscillation, a lever-supporting member fixed to said shaft to rock therewith, and a lever on said supporting member arranged to be rocked responsive to said tappet whereby said rock shaft will oscillate said reflecting flat, said lever being axially adjustably supported on said supporting member, said tappet having a seat for contact with a terminal of said lever, said terminal having a cam surface contacting said seat, whereby on axially adjusting said lever, said cam surface may be disposed at various points on said seat to change the oscillatory action of said reflecting flat, and means for releasably holding said lever in adjusted position relative to said supporting means.

8. In a motion picture projector having means therein for feeding the film in a continuous stream past the film gate aperture, a source of light, an optical train including an oscillatory reflecting flat, and a shutter movable for controlling the transmission of light through said train; the improvement which consists of a framing means moving in timed relation to the oscillatory movement of said flat and said shutter in juxtaposition to said film gate aperture for following and framing the picture of the particular film frame which is being reflected through the optical train during movement of said oscillatory reflecting flat, means affording corrective registry adjustments of said framing means during the operation of the projector and adjusting means for making corrective adjustments of said reflecting flat.

9. In a motion picture projector having means for feeding the film in a continuous stream past the film gate aperture, and an optical train including an oscillatory reflecting member; the improvement which includes a framing means in juxtaposition to said film gate movable for framing the picture desired to be projected in said gate aperture so as to positively screen from transmission through the optical train the transverse lines on the film separating said desired picture from contiguous pictures, while the film is fed in a continuous stream through said gate, and means for moving said framing means in timed relation to the oscillatory movement of said reflecting member, said framing member having a framing opening therein dimensioned to frame one picture at a time, the portions of said framing member which define the transverse margins of said opening being inwardly offset so as to lie closer to the film than the remainder of said framing member with their transverse edges overlying the transverse lines of the film bounding the desired picture and adjusting means for making corrective adjustments of said reflecting member.

10. In a motion picture projector having means for feeding the film in a continuous stream past the film gate aperture, and an optical train including an oscillating reflecting flat; the improvement which consists of a reciprocable shuttle mounted in juxtaposition to the film gate aperture having a framing opening dimensioned to frame the frame of the film desired to be projected, the portions of the shuttle which define the margins of said opening being disposed to overlie the transverse lines bounding said desired frame while the image of said frame is being transmitted through said optical train, a reciprocating tappet, means for operating said tappet, a head on said tappet having a seating surface, a drive means responsive to said tappet for reciprocating said shuttle, and means responsive to said tappet for oscillating said flat including a rock shaft on which said flat is mounted, a lever connected with and arranged to rock said shaft, and a member on a terminal of said lever having a cam surface seated on the seating surface of said head of the tappet.

11. In a motion picture projector having means therein for feeding the film in a continuous stream past the film gate aperture, a source of light, an optical train including an oscillatory reflecting flat, and a shutter movable for controlling the transmission of light through said train, the improvement which consists of a shuttle mounted in juxtaposition to the film gate aperture for reciprocable movement in a plane parallel to the plane of the film and provided with a framing opening dimensioned to encompass an entire frame picture of the film, the portions of said shuttle which define the transverse margins of said opening being disposed to overlie the transverse lines between the frame picture of the film visible through said opening while the image is being reflected by said oscillatory reflecting flat through said optical train, a reciprocable tappet member, a rotary shaft, a cam on said shaft for operating said tappet member, drive means responsive to said tappet member for oscillating said reflecting flat, a shuttle operating lever, arranged to reciprocate said shuttle when rocked on its fulcrum and a tappet operated lever mounted to rock said shuttle operating lever responsive to reciprocation of said tappet.

JOHN R. HEARST.

REFERENCES CITED

The following references are of record in the file of this patent:

UNITED STATES PATENTS

| Number | Name | Date |
|---|---|---|
| 1,646,341 | Baradat | Oct. 27, 1927 |
| 1,804,685 | Grimm | May 12, 1931 |
| 1,808,603 | Huc | June 2, 1931 |